(12) United States Patent
Ross

(10) Patent No.: US 9,511,702 B2
(45) Date of Patent: Dec. 6, 2016

(54) SYSTEM AND METHOD FOR VEHICULARIZATION OF A CARGO SHIPPING CONTAINER

(71) Applicant: Roger L. Ross, Elgin, SC (US)

(72) Inventor: Roger L. Ross, Elgin, SC (US)

(*) Notice: Subject to any disclaimer, the term of this patent is extended or adjusted under 35 U.S.C. 154(b) by 0 days.

(21) Appl. No.: 15/027,029

(22) PCT Filed: Oct. 3, 2014

(86) PCT No.: PCT/US2014/059125
§ 371 (c)(1),
(2) Date: Apr. 4, 2016

(87) PCT Pub. No.: WO2015/051292
PCT Pub. Date: Apr. 9, 2015

(65) Prior Publication Data
US 2016/0236610 A1    Aug. 18, 2016

Related U.S. Application Data

(60) Provisional application No. 61/866,836, filed on Oct. 4, 2013.

(51) Int. Cl.
*B60P 3/40* (2006.01)
*B60P 1/02* (2006.01)
*B62D 49/02* (2006.01)
*B62D 53/08* (2006.01)

(52) U.S. Cl.
CPC .. *B60P 3/40* (2013.01); *B60P 1/02* (2013.01); *B62D 49/02* (2013.01); *B62D 53/0864* (2013.01)

(58) Field of Classification Search
CPC ............... B60P 1/02; B60P 3/00; B60P 3/40; B62D 21/00; B62D 21/12; B62D 21/18; B62D 21/20; B62D 53/064; B66F 9/06
USPC ........... 254/2, 5, 10; 414/349, 352, 495, 458
See application file for complete search history.

(56) References Cited

U.S. PATENT DOCUMENTS

| | | |
|---|---|---|
| 3,392,857 A | 7/1968 | Tantlinger |
| 3,631,999 A | 1/1972 | Walerowski |
| 3,795,336 A | 3/1974 | Acker et al. |
| 4,199,298 A | 4/1980 | Webre, Jr. et al. |
| 4,452,555 A | 6/1984 | Calabro |
| 4,819,955 A | 4/1989 | Cobb |
| 5,326,214 A | 7/1994 | Swisher |

(Continued)

OTHER PUBLICATIONS

Copenheaver, Blaine R.; PCT/US2014/059125; International Search Report and Written Opinion; ISA/US; Jan. 14, 2015.

(Continued)

*Primary Examiner* — Jonathan Snelting
(74) *Attorney, Agent, or Firm* — Nexsen Pruet, LLC; Michael A. Mann

(57) ABSTRACT

A system and method for moving cargo shipping containers includes a tractor with a first unit and a separate second unit. The first and second units grip the front and back ends of the container to lift it, using the tractor for the front chassis and the second unit for the back chassis. The cargo container becomes its own trailer. The second unit may be towed by the tractor behind the first unit, maneuvered into position at the back of the container, and then coupled to the container for lifting. The tractor may then position the first unit to the front of the container for attachment, and then proceed to a destination. Hydraulic cylinders operated off the tractor's power take off provide the lifting force.

11 Claims, 9 Drawing Sheets

(56) References Cited

U.S. PATENT DOCUMENTS

| | | |
|---|---|---|
| 6,821,066 B2 | 11/2004 | Wehrli |
| 8,118,532 B2 | 2/2012 | Phillips |
| 8,215,240 B2 | 7/2012 | Graaff et al. |
| 8,465,246 B2 | 6/2013 | Duell et al. |
| 2010/0303596 A1 | 12/2010 | Dagorret |
| 2012/0189414 A1 | 7/2012 | Lukesic |
| 2012/0298935 A1 | 11/2012 | Ross |

OTHER PUBLICATIONS

Snelting, Jonathan; PCT/US2014/059125; International Preliminary Report on Patentability; ISA/US; Oct. 9, 2015.

SYSTEM AND METHOD FOR VEHICULARIZATION OF A CARGO SHIPPING CONTAINER

PRIORITY CLAIM

Priority is claimed to U.S. provisional patent application No. 61/886,836, filed Oct. 4, 2013, which is incorporated herein by reference. U.S. Pat. No. 8,646,753 is a related patent and is hereby incorporated by reference.

SUMMARY OF THE INVENTION

According to its major aspects and briefly recited, the present invention is a system and method for moving cargo shipping containers. The system includes a tractor with a first unit and a separate second unit that may be towed by the tractor using the first unit. The second unit may be attached to the back of a cargo shipping container, and the first unit, to the front of the container. The first and second units may then lift the container and be hauled away by the tractor. The container is thus vehicularlized by the front and back units and supports itself between them without a trailer. Accordingly, one driver with a tractor and both first and second units, may pick up a cargo shipping container that may be on the ground and move it to a distant destination, over a highway and at highway speeds, and then leave the container at its destination.

Those skilled in intermodal transportation of cargo shipping containers will appreciate the efficiency improvements in logistical movement of goods in cargo shipping containers resulting from the present invention and its many features and advantages from a careful reading of the Detailed Description of Embodiments accompanied by the following drawings.

DETAILED DESCRIPTION OF EMBODIMENTS OF THE INVENTION

Figure 1:
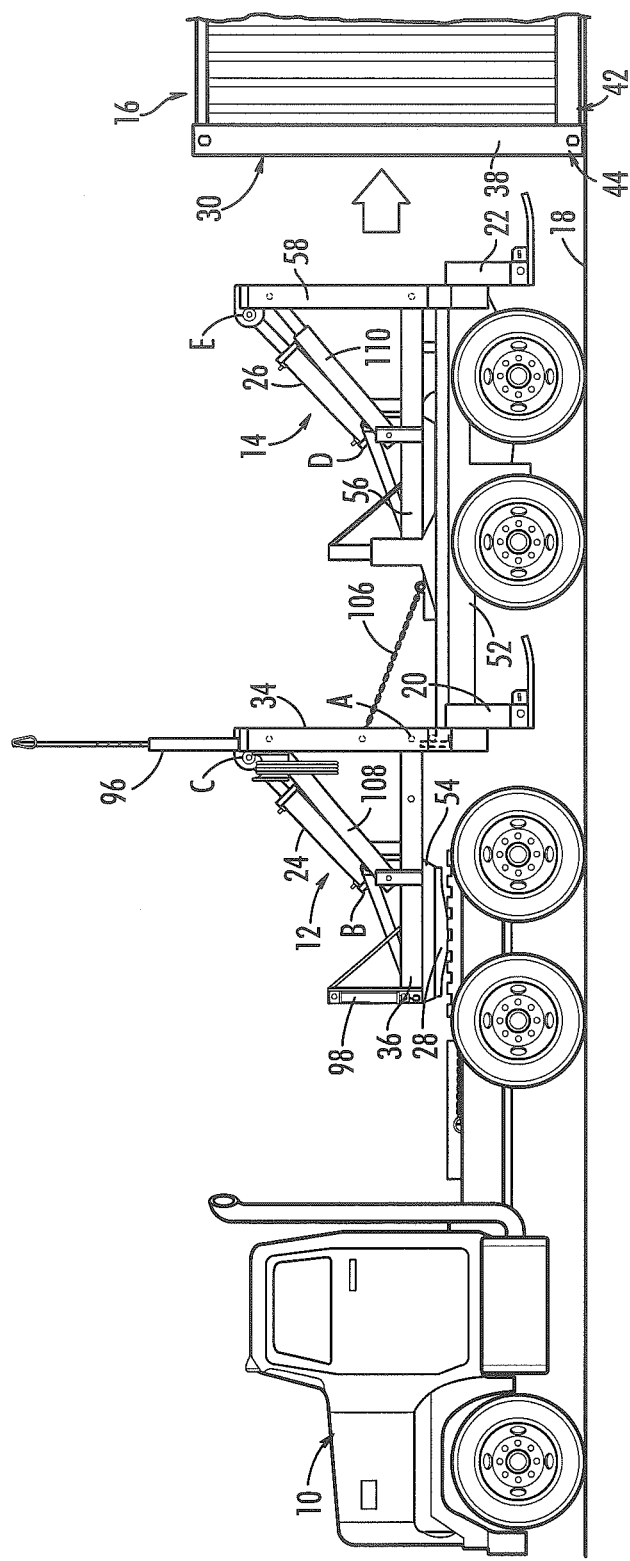
FIG. 1 is a side view of the present system shown with a tractor, having the first unit attached to it and the second unit in tow, backing toward the back of a cargo shipping container.

The present invention is a system and method for vehicularization of a cargo shipping container so that the container can then be hauled without use of a trailer, and also without need of a crane to place the container on a trailer or crew to do so.

In this context, the term system refers to plural components that may or may not be physically attached to each other at all times, but which cooperate with each other to achieve a useful result. Here, the useful result is lifting and moving a cargo shipping container. The term vehicularization means that the cargo shipping container becomes its own trailer body when connected to the first and second units and is not placed on a separate trailer or other type of supporting framework. Furthermore, the tractor and first and second units may vehicularize a cargo shipping container resting initially on the ground, on timbers, or on a concrete pad.

An intermodal container (also called simply container, freight container, ISO container, shipping container, hi-cube container, box, conex box and sea can) is a standardized reusable steel box for storing and moving materials and products through a global intermodal freight transport system. "Intermodal" means that the container can be transferred from one mode of transportation to another, that is, moved among ships, railroad cars, and trucks, without unloading and loading the container contents. Cargo shipping containers vary in length from 2.4 m to 17 m and in height from 2.4 m to 2.9 m. However, the present invention can be readily adapted to move any container with a rectangular footprint.

As shown in FIGS. 1, 3, 5, 6, and 8, this system comprises a tractor 10 and two units, a first unit 12 that is connectable to a sliding fifth wheel 28 of tractor 10 and to the front 32 of a cargo shipping container 16, and a second unit 14 that is connectable to the back 30 of a cargo shipping container 16. Once connected, tractor 10 may lift container 16 and haul it over the road. See FIGS. 7 and 8 for this configuration.

When the first and second units 12, 14, are connected to the shipping container 16, tractor 10 can provide power to both units, via the power take off unit typical of tractors generally, to hydraulic cylinders 24, 26 which are carried, respectively, by first and second units 12, 14. The hydraulic power enables hydraulic cylinders 24, 26, to lift cargo container 16 off the ground 18. Compare FIG. 7 to FIG. 8.

As will be described below, once cylinders 24, 26, lift container 16, container 16 is locked in the lifted position to relieve cylinders 24, 26, and then container 16 may be hauled by tractor 10 over any distance and up to highway speeds.

Accordingly, the present system may be used to haul containers between a place where they are loaded to a place where they may be unloaded, including destinations that have no loading dock. The present system may also be used to reposition containers in a depot or distribution facility or to haul containers to a railroad siding for later loading onto rail cars.

Importantly, the present system and method requires only a trained driver to position first unit 12 and second unit 14 and lift cargo shipping container 16 using a single tractor 10 so that a container 16 may be moved from place to place. A crane and crane operator do not have to assist unless the cargo shipping container is being loaded onto or off of a rail car or ship. Even then, the operation of the crane is decoupled from that of the operation of the present system because the driver and the crane operator do not have to be standing by, waiting for the other to perform a movement.

Figure 6:
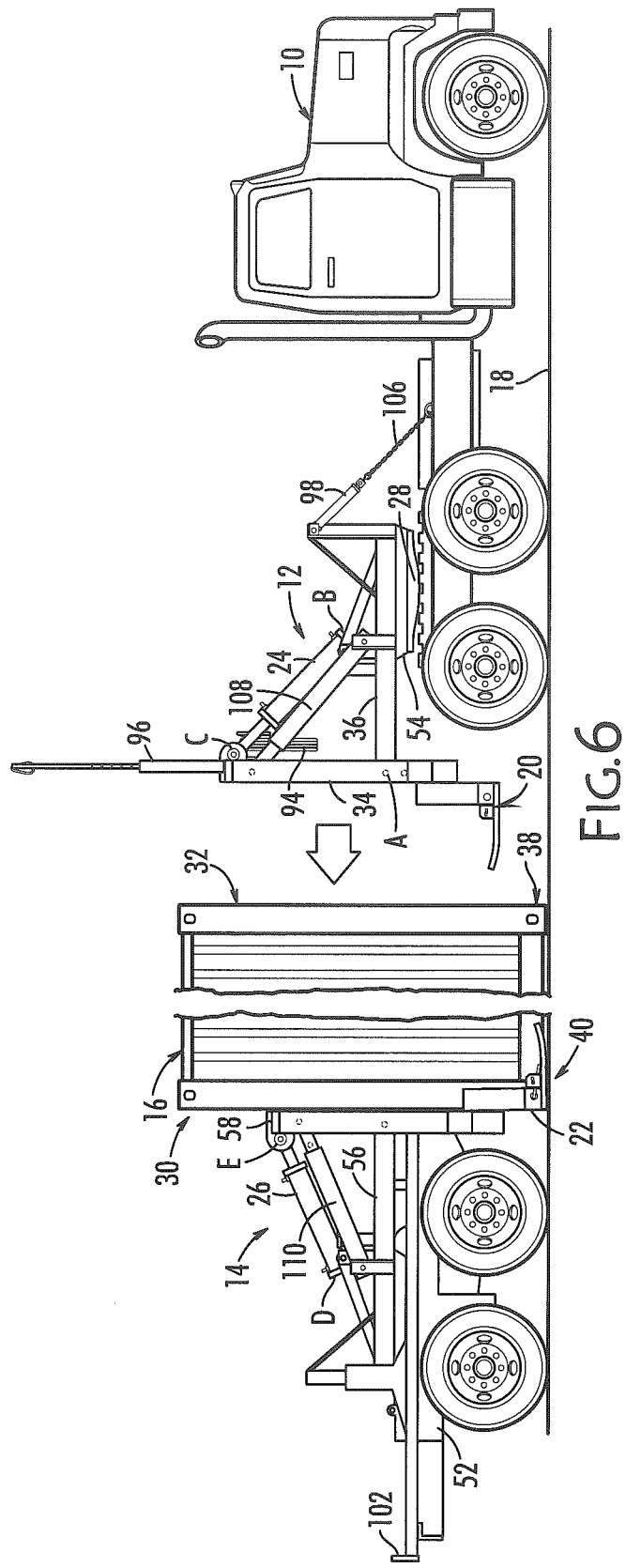
FIG. 6 is a side view of the tractor and first unit moved into position at the front end of the cargo shipping container ready to be attached to the front end of the container.
Figure 7:
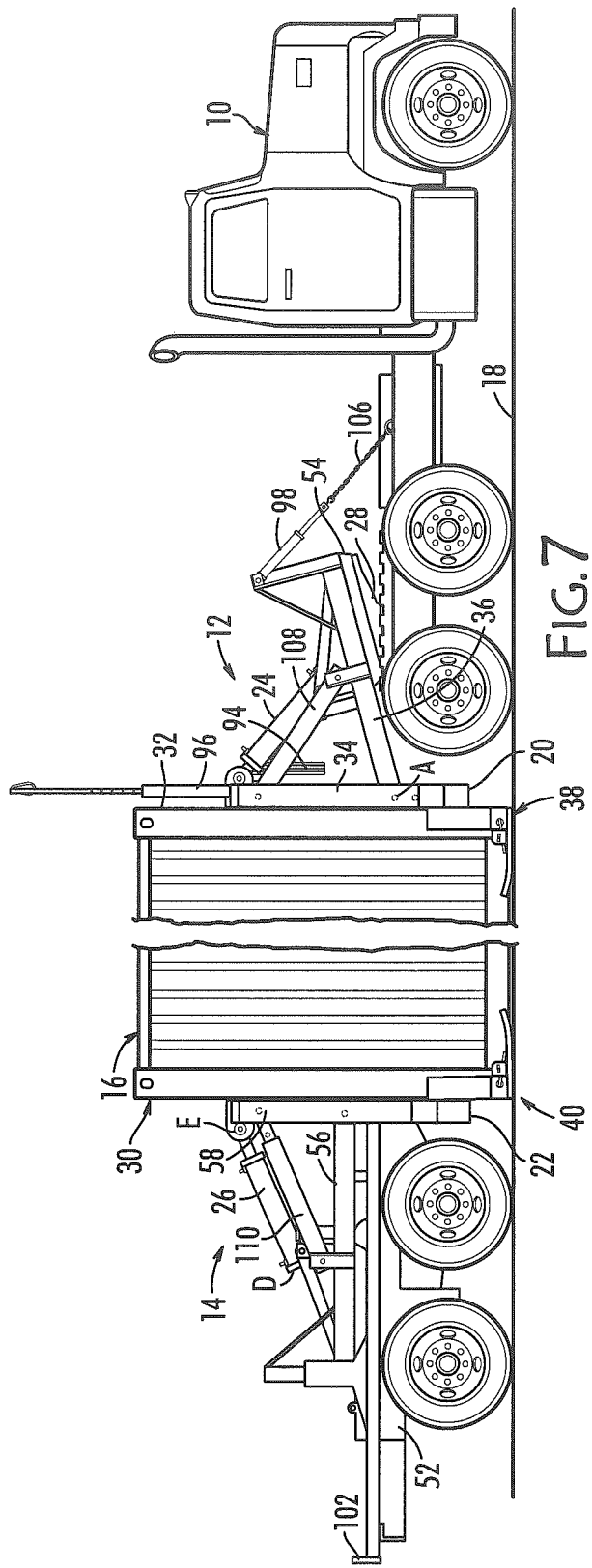
FIG. 7 is a side view of the tractor and first unit coupled to the front end of the cargo shipping container, with both the first and second units ready to lift the container.
Figure 8:
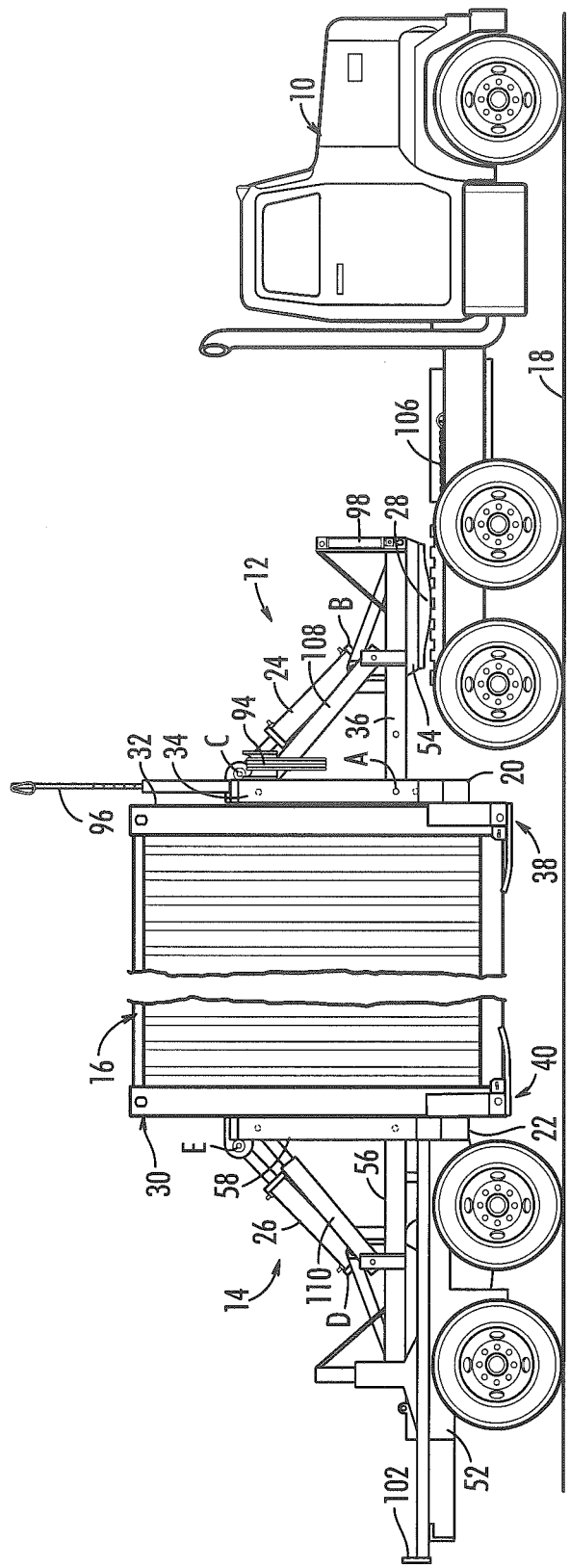
FIG. 8 is the present system with the cargo shipping container lifted for over-the-road hauling by the tractor using the first and second units.

As illustrated in FIG. 1, tractor 10 and front first unit 12 can be used to haul second unit 14 and to move second unit 14 into position on the back 30 of shipping container 16. This capability is important. Tractor 10 not only moves first unit 12, to which it is permanently attached, but it can also move second unit 14 between locations, and may then position second unit 14 by backing it into position at the back 30 of container 16. Once tractor 10 and first unit 12 have second unit 14 in position, second unit 14 is released from first unit 12, and then tractor 10 moves first unit 12 to the front 32 of container 16, as seen in FIG. 6.

As seen in FIGS. 1, 3, 5-8, first unit 12 has a vertical frame 34 and a horizontal frame 36. Vertical frame 34 and horizontal frame 36 are pivotally joined together where they meet, at point A. The term horizontal is to be understood relative to ground 18 that first unit 12 rests on and means parallel to the ground 18; vertical is perpendicular to ground 18. Horizontal frame 36 carries a king pin similar to that found under a typical trailer, and which slides onto the slot formed in the standard fifth wheel 28 of the tractor 10 so that the tractor 10 can secure the king pin of the first unit 12 in the same manner that it would latch the king pin of a conventional trailer.

Vertical frame 34 carries two couplers 20, one on each side, to secure vertical frame 34 to the bottom two corners 38 of front 32 of cargo shipping container 16. Couplers 20 grip cargo shipping container 16 and lock to it at the corners 22 of container 16. Couplers 20 of first unit 12 lock to corners 38 at the front 32 of cargo shipping container 16 and couplers 22 of second unit 14 lock to two bottom corners 40 at the back 30 of the cargo shipping container 16. Couplers 20 are attached to the vertical frame 34 (see FIG. 1 and FIGS. 2A-2C) where coupler 20 captures corners 38 of front 32 of container 16 from a bottom 42 front side 44 and side 46 of container 16. Coupler 22 captures corners 40 of back 30 of container 16 in the same way, the back 30 of container 16 being a mirror image of the front.

Figure 2A:
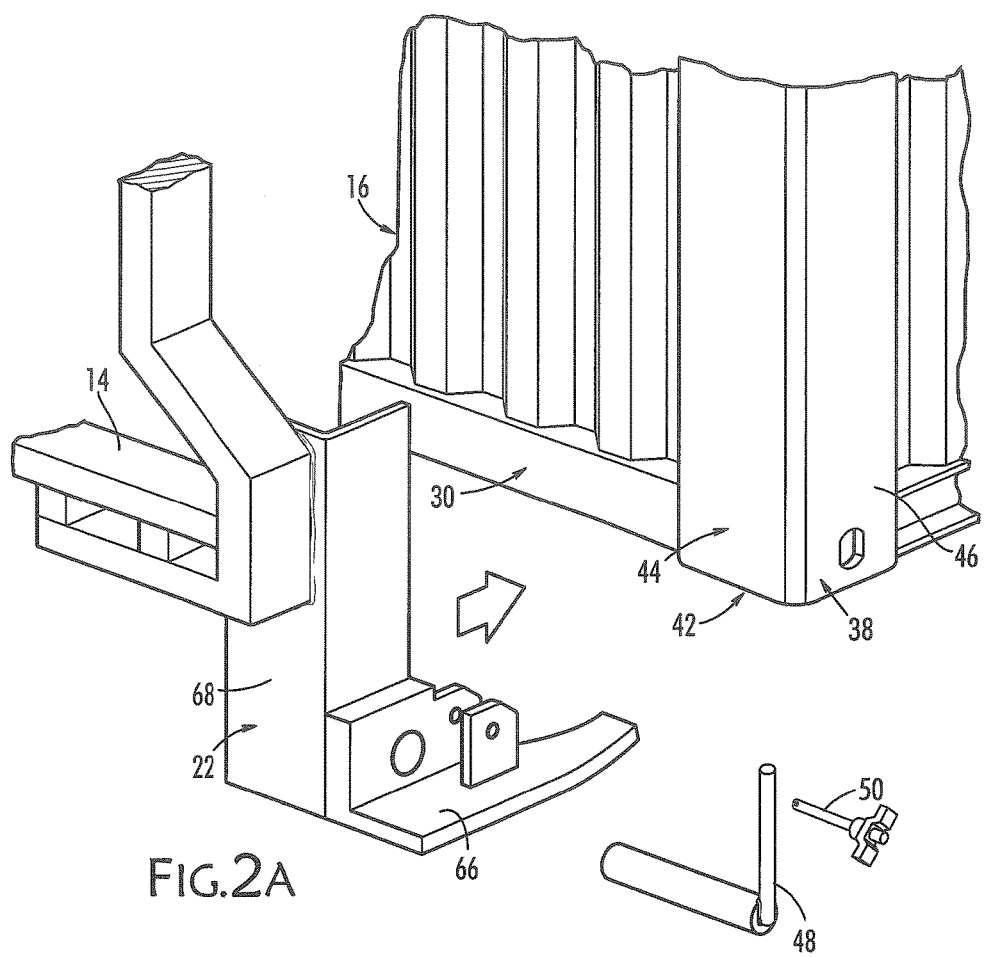
FIG. 2A is a perspective, partially-exploded view showing the corner of the cargo shipping container and the coupler of the second unit.
Figure 2B:
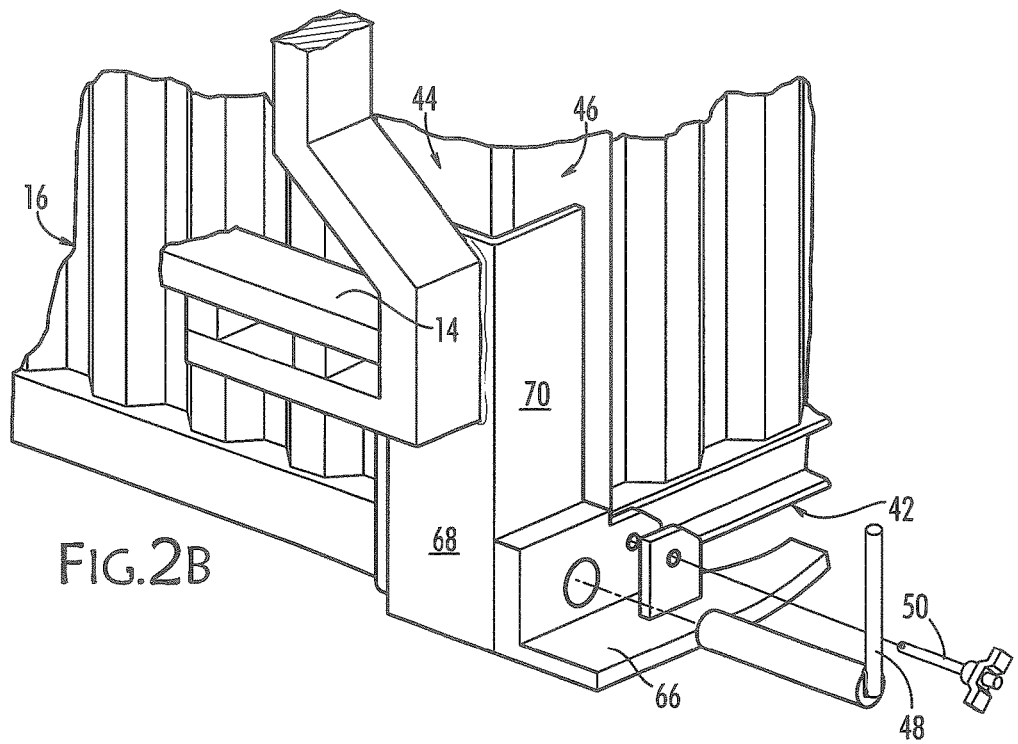
FIG. 2B is a perspective, partially-exploded view showing the corner of the cargo shipping container and the coupler of the second unit, with a locking pin for securing the coupler of the second unit to the cargo shipping container.
Figure 2C:
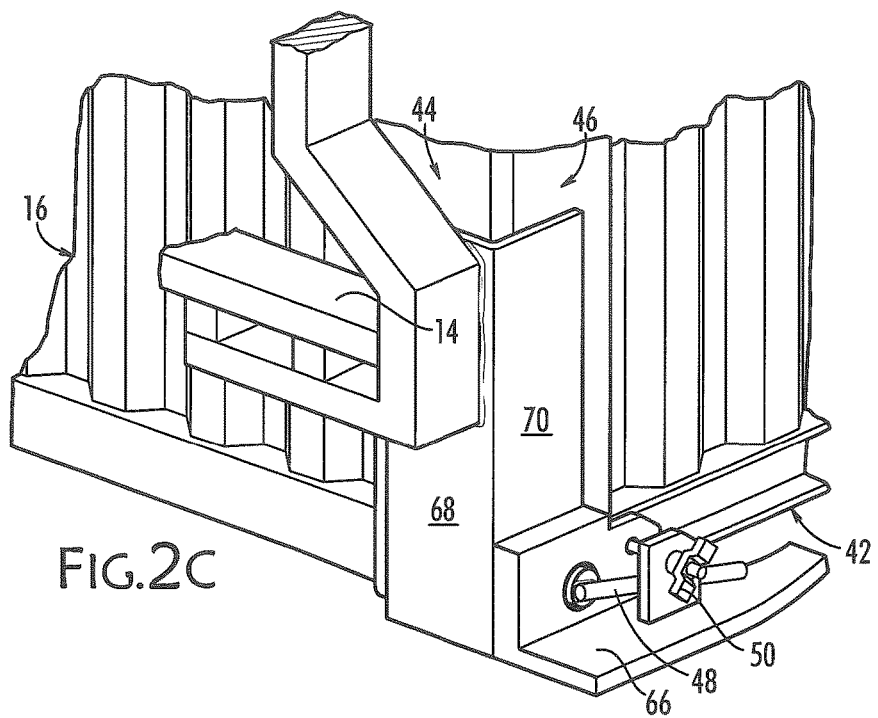
FIG. 2C is a perspective view of the corner of the second unit showing the coupler locked and pinned thereto.
Figure 3:
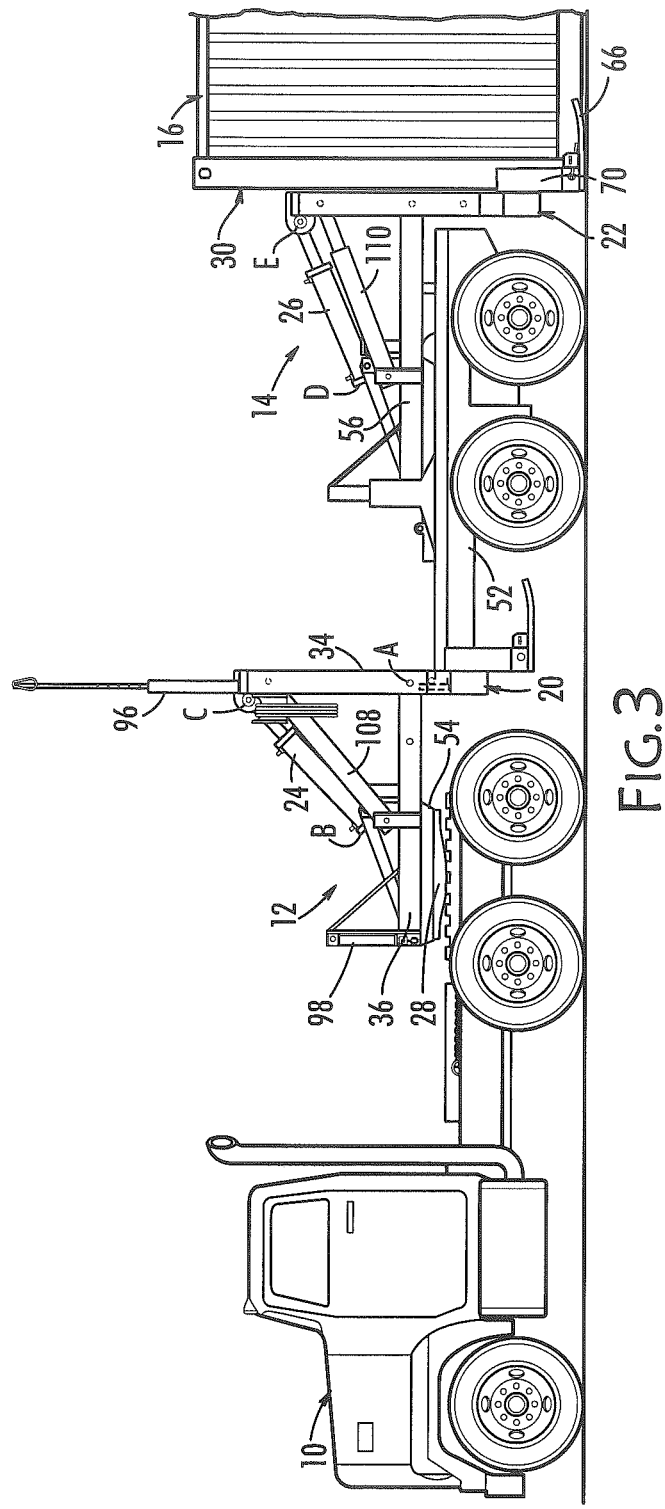
FIG. 3 is a side view of the present system showing the second unit coupled and locked to the back of the container.
Figure 4:
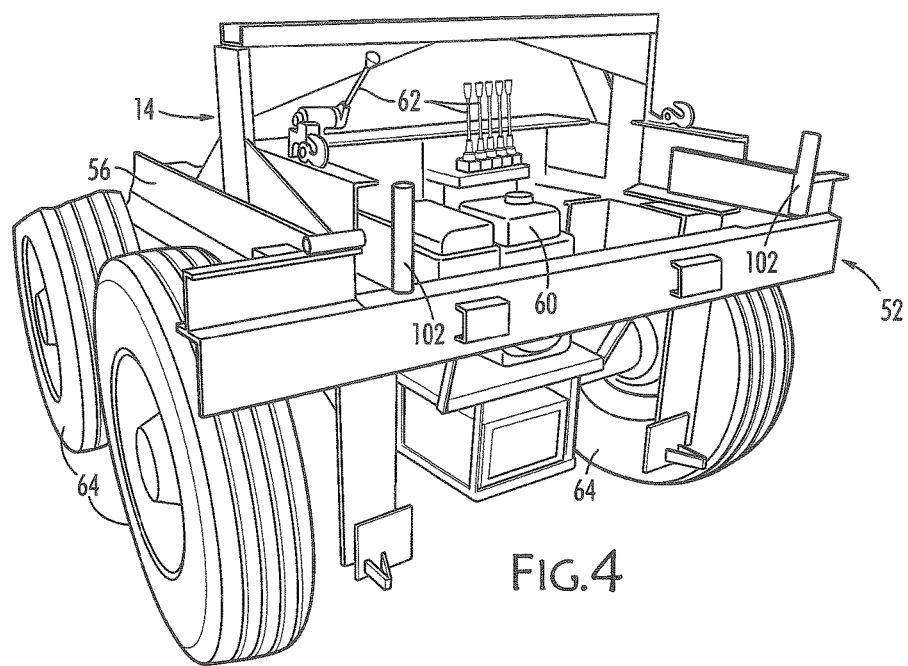
FIG. 4 is a rear view of a portion of the second unit.
Figure 5:
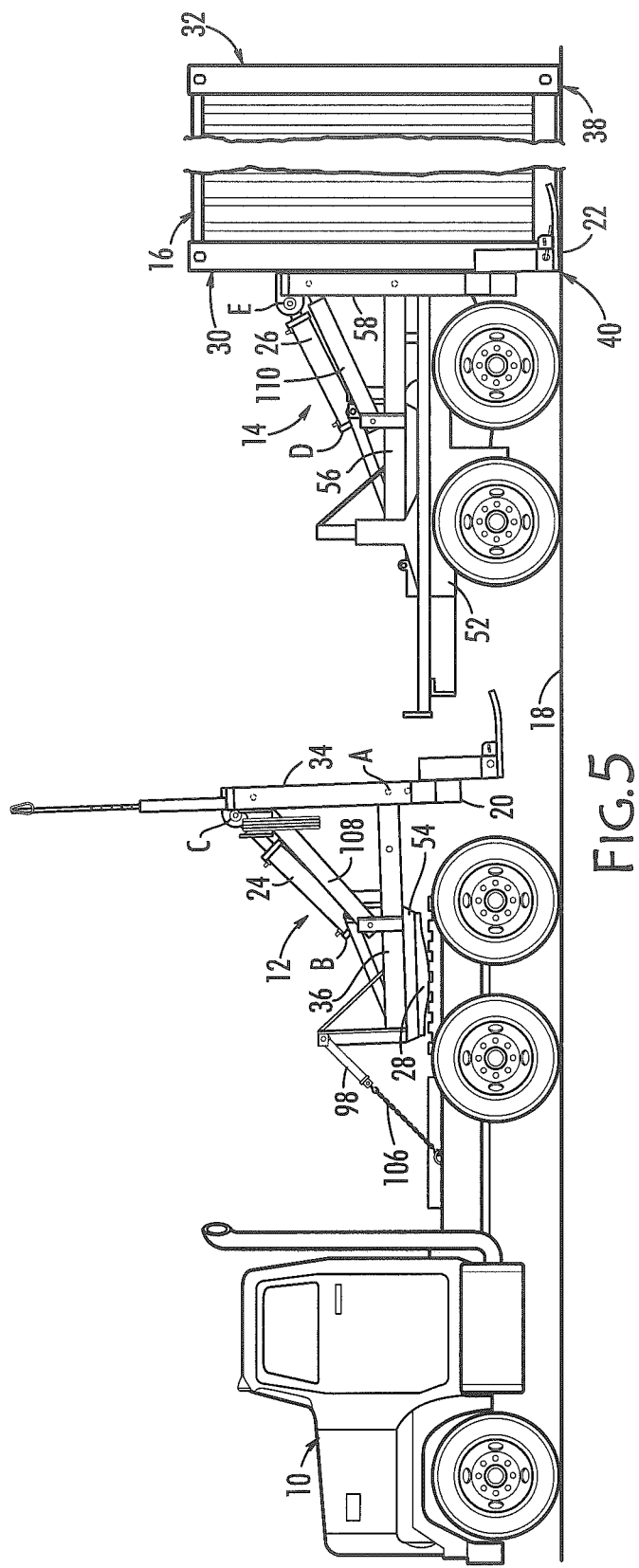
FIG. 5 shows a side view of the present system showing the tractor and first unit unhooked from the second unit, which remains attached to the back of the cargo shipping container.

A locking lever 48 on coupler 20 is rotated toward the opposite end of container 16 to lock coupler 20 to corner 38 of container 16, which locking lever 48 is then secured by a pin 50 when locking lever 48 is in its locked position, as best seen by comparing FIG. 2B to FIG. 2C.

Hydraulic cylinder 24 is pivotally connected to horizontal frame 36 at Point B and to vertical frame 34 at point C. Cylinder 24 pivots with respect to vertical frame 34 and horizontal frame 36 about their respective pivot points when extending and retracting vertical frame 34 with respect to horizontal frame 36 and thereby moves the top of vertical frame toward and away from front 32 of cargo shipping container 16. An auxiliary hydraulic cylinder 98, best seen in FIGS. 6 and 7 pivots horizontal frame 36 with fifth wheel 28 as it offsets the weight of horizontal frame 36 on fifth wheel 28 and allows it to assume its un-weighted pitch. Between hydraulic cylinder 24 and auxiliary cylinder 98, vertical frame 34 may be lowered and pivoted toward the corners 38 of container 16. Then, by extending cylinder 24, while retracting auxiliary cylinder 98, front 32 of container 16 and vertical frame 34 may be both raised and brought to a vertical position.

Second unit 14 is similar to first unit 12 except that it has no tractor 10 but it does include a chassis 52 similar to that of tractor 10. It has a horizontal frame 56 and a vertical frame 58 for engaging the back 30 of the cargo shipping container 16. The term chassis refers to a set of one or more axles with wheels, brakes, tail lights, a suspension system and suitable hydraulic and electrical connections such as are customarily used at the back end of any tractor or trailer frame. Second unit 14 also includes a hydraulic cylinder 26 pivotally carried by horizontal frame 56, pivoting about point D, and pivotally connected to vertical frame 58 at point E for lifting vertical frame 58 with respect to horizontal frame 56. An auxiliary hydraulic cylinder 110 may be included to facilitate tilting of horizontal frame 56 as with auxiliary cylinder 108, that is, by offsetting the weight of horizontal frame 56, fifth wheel 54 may resume its normal un-weighted pitch.

Fifth wheels 28, 54 are preferably sliding fifth wheels, that is, fifth wheels that can be moved forward or backward with respect to their respective chassis so that they can be better balanced for the load to be carried.

Second unit 14 may also, in some embodiments, include hydraulic fluid pumps 60 carried by chassis 52 and in operative connection with additional hydraulic cylinders (not shown) for supplying hydraulic fluid under pressure in order to provide mobility, steering, and hydraulic cylinder movement for second unit 14. For example, if first and second units 12, 14, of the present system are to be used in confined areas in which tractor 10 would have insufficient room to position second unit 14, then a steerable, self-propelled second unit 14 with the afore-mentioned hydraulic fluid pump 60 would be preferred to the towable second unit 14 described above. Controls 62 would allow the driver to direct hydraulic fluid to these various additional hydraulic cylinders (not shown) for propelling wheels 64 and for steering (not shown), for example.

To provide a secure connection between first and second units 12, 14 and the front and back 32, 30 of the cargo shipping container 16, first and second units each include two couplers 20, 22, respectively. Couplers 20, 22, engage the corners of the ends of cargo shipping container 16 and secure those corners to vertical frames 34, 58, of each unit 12, 14, by providing a physical interface between coupler 20, 22, and the ends, sides and bottoms of corner 38, 40, respectively, of container 16 so that vertical frames 34, 58, can easily, quickly, and securely grip corners 38, 40, for moving container 16. Couplers 20, 22 come in symmetric pairs. As in the case of the first unit 12, the bottom of vertical frame 58 carries two couplers 22 for securing second unit 14 to back 30 of cargo shipping container 16. Couplers 20 and 22 each include a bottom plate 66, an end plate 68 and a side plate 70 that engage and capture the three sides of each corner 38, 40, of cargo shipping container 16. Bottom plate 66 may be curved up slightly and tapered toward its distal end. Locking levers 48 are rotated to the locking position and secured in their locked position with pins 50 to hold couplers 20, 22, to corners 38, 40. Because couplers 20, 22, engage and capture each of the four corners of container 16, front and back units 12, 14, control the movement of container 16.

Vertical frame 34 of the first unit 12 and the vertical frame 58 of the second unit 14 have rest positions, in which vertical frames 34, 58 rest on the ground 18, and have travel positions wherein the hydraulic cylinders 24, 26 of the first and the second units 12, 14, respectively, raise vertical frames 34, 58 by a height of at least 10 cm (4 inches) or even higher, such as at least 25 cm (10 inches) or 40 cm (16 inches) for highway hauling.

Second unit 14 can be connected to first unit 12 so that tractor 10 can tow second unit 14. Towing is possible when the back of first unit 12 is connected to the front of second unit 14. The connection may be made in a number of ways, including informal ways such as tow chains, tow bars, or various types of hitches suitable for safely towing second unit 14 behind first unit 12. Alternatively, front and back units 12, 14, may be made to interconnect, for example, by raising the back of horizontal frame 36 of first unit 12 using auxiliary cylinder 98 mounted to the front of the first unit 12. The terms front and back are relative to the direction of movement of tractor 10 when in a forward gear. Then tractor 10 may back first unit 12 over the front 96 of the second unit 14. Two, spaced-apart vertical posts 102 mounted to horizontal frame 56 on front 96 of second unit 14 will slide under the back of first unit 12 when it is backed sufficiently far enough. Then the two hydraulic cylinders 98 of the first unit 12 lower horizontal frame 36 to a level position. A pair of chains 106 (see FIG. 1) is used to secure the front of the second unit 14 to the back of first unit 12. When auxiliary cylinder 98 is activated, it will lower the back of horizontal frame 36 of first unit so that posts 102 are inside horizontal frame 56 on front 96 of second unit 14, thereby capturing second unit and enabling tractor 10 to tow second unit 14 behind first unit 12.

For hydraulic hose and electrical cable management, a hose support 94 is attached to vertical frame 34 of front unit 12 along with a flexible mast 96 that allows hydraulic hoses to be held aloft over cargo shipping container 16 when they are run from tractor 10 to second unit 14.

What is claimed is:

1. A system for use with a tractor and a cargo shipping container, said tractor having a fifth wheel, said cargo shipping container having a front and a back, said front having two bottom corners and said back having two bottom corners, said system comprising:
   (a) a first unit, including
     (i) a vertical frame for engaging a front of a cargo shipping container,
     (ii) a horizontal frame that is securable to a fifth wheel of a tractor,
     (iii) hydraulic cylinder carried by said horizontal frame and connected to said vertical frame for lifting said vertical frame with respect to said horizontal frame, and
     (iv) two couplers carried by said vertical frame for securing said vertical frame to said front end of said cargo shipping container;
   (b) a second unit, including
     (i) a chassis;
     (ii) a vertical frame for engaging a back of said cargo shipping container,
     (iii) a horizontal frame attached to said chassis, and
     (iv) a hydraulic cylinder carried by said horizontal frame and connected to said vertical frame for lifting said vertical frame with respect to said horizontal frame, and
     (v) two couplers carried by said vertical frame for securing said vertical frame to said back of said cargo shipping container; and
   (c) means for connecting said first unit to said second unit so that said second unit can be towed by tractor.

2. The system as recited in claim 1, wherein said means for connecting is carried by said second unit.

3. The system as recited in claim 1, wherein said means for connecting includes an interlock carried by said second unit that prevents said horizontal frame of said first unit and said horizontal frame of said second unit from separating when said first unit tows said second unit.

4. The system as recited in claim 1, wherein said fifth wheel of said tractor has a horizontal position and a tilted position, and wherein said horizontal frame of said first unit has a horizontal position and a tilted position corresponding to said horizontal and tilted positions, respectively, of said fifth wheel; and wherein said means for connecting includes at least one post carried by said horizontal frame of said first unit, said at least one post being below said horizontal frame of said second unit when said horizontal frame of said first unit is in said tilted position and inside said horizontal frame of said second unit when said first unit is in said horizontal position so that said horizontal frame of said first unit is interlocked with said horizontal frame of said second unit.

5. The system as recited in claim 4, wherein said at least one post is two, spaced-apart posts.

6. The system as recited in claim 1, wherein said couplers of said first unit engage only bottom corners of said front of said cargo shipping container.

7. The system as recited in claim 6, wherein each coupler of said couplers of said first unit includes a bottom, a side and a back and wherein said bottom, said side and said back of said each coupler engage a bottom, side and back of one corner of said bottom corners of said cargo shipping container.

8. The system as recited in claim 1, wherein said couplers of said second unit engage only bottom corners of said back of said cargo shipping container.

9. The system as recited in claim 8, wherein each coupler of said couplers of said second unit includes a bottom, a side and a back and wherein said bottom, said side and said back of said each coupler engage a bottom, side and back of one corner of said bottom corners of said cargo shipping container.

10. The system as recited in claim 1, further comprising a mast carried by said first unit for holding a hydraulic hose.

11. The system as recited in claim 1, further comprising a hose bracket carried by said first unit for holding a coiled hydraulic hose.

* * * * *